3,592,832
PREPARATION OF AMORPHOUS GUANIDINE SILICATE POWDERS
Paul Clifford Yates, Wilmington, Del., assignor to E. I. du Pont de Nemours and Company, Wilmington, Del.
No Drawing. Filed June 4, 1969, Ser. No. 830,543
Int. Cl. C07f 7/02; 7/04
U.S. Cl. 260—448.2N       6 Claims

ABSTRACT OF THE DISCLOSURE

A process has been developed for preparing dry powders of amorphous guanidine silicate wherein an aqueous solution of water soluble amorphous guanidine silicate having a guanidine to $SiO_2$ mole ratio of from 0.67:1 to 1.2:1 is mixed with from 1 to 10 volumes of ethanol or isopropanol per volume of solution to precipitate amorphous guanidine silicate, which is then removed and dried. These dry powders of amorphous guanidine silicate find utility as binders for MgO in high temperature ramming mixtures to repair eroded and torn areas in steel blast furnaces.

BACKGROUND OF THE INVENTION

Crystalline guanidine silicates and process for their preparation are disclosed in U.S. Pat. 2,689,245 and a novel composition of amorphous guanidine silicate has been prepared as described in my allowed, copending patent application Ser. No. 715,556, filed Mar. 25, 1968. However, the production of amorphous guanidine silicate is distinct from that of crystalline guanidine silicate and preparation of dry powders of amorphous guanidine silicate has been difficult since it involves the tedious process of constant water removal such as by evaporation. A faster and more economical process has been sought for the production of this product in its dry powder form and such a process has now been developed.

SUMMARY OF THE INVENTION

A process for the recovery of dry powders of amorphous guanidine silicate from aqueous solutions has been developed wherein an aqueous solution of amorphous guanidine silicate having a $SiO_2$ content of from 10 to 30% by weight and a ratio of guanidine to $SiO_2$ of from 0.67:1 to 1.2:1 is mixed with about one to ten volumes of ethanol or isopropanol and the precipitated amorphous guanidine silicate is recovered and dried.

DESCRIPTION OF THE INVENTION

The guanidine cation

The usual source of the guanidine cation is guanidine hydroxide.

Guanidine hydroxide may be prepared by techniques known to the art or by the adaptation of techniques which have been employed to prepare free hydroxides of other strong organic bases. For example, guanidine hydroxide can be prepared by the precipitation of calcium carbonate from solutions of guanidine carbonate by the addition of lime, by precipitation of barium sulfate from solutions of guanidine sulfate by the addition of barium hydroxide, the precipitation of silver chloride from guanidine chloride by the addition of freshly precipitated silver oxide or ammoniacal silver hydroxide, as well as precipitations employing the iodide or bromide of guanidine. Solutions of guanidine hydroxide may also be prepared by deionization of a soluble guanidine salt employing the hydroxyl form of a strong basic anion exchange resin.

Silica sources

A variety of sources of silica may be employed in the processes of the invention. These include precipitated gels and powders of colloidal amorphous silica having surface areas in excess of 20 $m.^2/g.$ and preferably in excess of 100 $m.^2/g.$ They also include colloidal sols of amorphous silica having the same surface areas.

Such sols, powders, gels and precipitates can be prepared in a variety of ways well known to the art. These include precipitation of solutions of alkali metal silicates with acids; followed by washing to obtain a high surface area silica gel; oxidation or hydrolysis of silicon tetrachloride; and the controlled polymerization and growth of colloidal amorphous silica particles from solutions of silicic acid or higher surface area silica sols. High surface area amorphous silica residues may also be prepared by acid leaching clay minerals, such as magnesium or aluminosilicate minerals, as well as by a variety of other techniques which are known and practiced in the art.

Alternatively, solutions of silicic or polysilicic acids may be employed as the siliceous raw materials. These include, for example, solutions prepared by the neutralization of dilute solutions of alkali metal silicates with acids, followed by purification to eliminate the metal salts produced by the neutralization. Solutions of silicic acid prepared by the deionization of alkali metal silicates with cation exchange resins in the hydrogen form, and solutions prepared by the hydrolysis of silicate esters such as ethyl orthosilicate can also be used. It is only necessary that such silicic acid solutions have a very limited stability, since their rate of reaction with guanidine hydroxide to form guanidine silicates is quite rapid.

Silica sols suitable as reactants may also be prepared from silicon metal. For example metallic silicon may be reacted with concentrated aqueous ammonia solutions or aqueous solutions of amines. In addition, metallic silicon and certain silicon metal alloys are also useful directly, as sources of silica, in which instance the reaction to form the active form of silica and the reaction to form the guanidine silicate compositions of this invention from such raw materials occur almost simultaneously. For example, solutions of guanidine hydroxide may be reacted with finely divided silicon metal.

Alternatively, guanidine cations can be formed "in situ" and reacted with silicate anions at the moment of their generation to form the compositions of this invention in a single step. The guanidine form of a cation exchange resin can be prepared by contacting the hydrogen form of the resin with guanidine hydroxide or guanidine carbonate.

Thus, a guanidine cation exchange resin can be reacted with an alkali metal silicate solution having mole ratios of metal cation to silica between 1.2 and 0.65 directly to generate the compositions of the invention in a single rapid operation.

Also, solutions of guanidine carbonate could be reacted with a suspension of a calcium silicon alloy, again observing the relative proportions of the guanidine carbonate and calcium silicon alloy to obtain a guanidine silicate and calcium carbonate as products. After the reaction, the product would be separated from the insoluble calcium carbonate by filtration.

The reaction

A most critical aspect of the process required to obtain the products of the invention is close control of the relative proportions of the reactants. Close control must also be exercised over reaction conditions. It is critical for the successful operation of the processes of this invention, and to obtain the products thereof, that the mole ratios of guanidine hydroxide to silica in the reacting solution fall within the limits of from 1.2 to 0.65.

When mole ratios of guanidine to silica higher than 1.2 are employed, water-insoluble crystalline guanidine silicate precipitates are formed at relatively low concentrations of silica. It seems possible that such silicates may contain direct silicon to nitrogen bonds, or perhaps a multiplicity of such bonds. In any event, these crystalline, water-insoluble silicates are always obtained at low silica concentrations when mole ratios of guanidine to reactive silica higher than about 1.2 to 1 are used.

When mole ratios of guanidine to silica less than 0.65 are used, undesirably rapid increases in the viscosity of the resulting solutions occur.

When the mole ratio of guanidine to silica is below 0.65, and especially if highly reactive sources of silica such as silicic acid or polysilicic acid are used, it is possible to obtain relatively concentrated, although highly viscous, metastable solutions as a result of the initial interaction between the guanidine hydroxide and reactive silica. When less reactive forms of silica such as colloidal silica sol particles or silica gel particles are used at these mole ratios, the excess silica initially fails to react. When it finally does react, gels and solutions of excessively high viscosity are obtained.

Solutions having below 0.65 mole of guanidine per mole of silica are not indefinitely stable, and the stability upon storage is a function of both the mole ratio and the solids concentration. In some circumstances, it is useful to have a material which has a lower mole ratio than 0.65, and these may be prepared but they have only a limited stability of from a few hours to about a week. In such circumstances, it is possible to prepare materials having ratios lower than the recommended lower limit, and these may be employed so long as stability is not a critical factor. However, below 0.5 mole of guanidine per mole of silica, it is not possible to prepare even temporarily, a clear ionic solution of guanidine silicate.

A second critical factor in the operation of the processes of this invention, and for obtaining the novel products thereof, is a close control over the time and temperature conditions for conducting the reaction between the source of guanidine hydroxide and the source of active silica. The time required depends both on the temperature and on the relative reactivity of the source of silica employed. For example, if silicic acid or very low polymers of silicic acid are used as the reactive silica source, extremely short reaction times at room temperature are sufficient to prepare the guanidine silicate compositions of the invention. With less reactive silica sources, such as silica sols and silica gels and powders, reaction times are longer and become undesirably long at room temperature for the lower surface area sources. Thus, reaction times as long as from 6 to 24 hours or even longer may be required at room temperature and below when using the less reactive forms of silica.

These times may be shortened by raising the temperature of the reaction, but caution must be employed that it is not too high and especially that the reaction mass does not remain at high temperatures over extended periods of time. This is because the guanidine cation itself is subject to a hydrolysis reaction at elevated temperatures, wherein it is first hydrolyzed to urea and ammonia, and is ultimately hydrolyzed to ammonium carbonate. For this reason, it is undesirable to employ reaction temperatures above 100° C. The preferred range is 25° to 95° C. It is also undesirable to run the reaction temperatures below 25° C. because of the possibility of forming crystalline guanidine silicates which will precipitate as highly water insoluble compounds.

Even with the least reactive of the silica raw materials, reaction times at the upper end of the temperature range are seldom in excess of a few minutes.

The time of reaction follows an inverse relationship to the temperature, and is also directly related to the reactivity of the silica raw material employed. As previously noted, nonomeric silicic acid and low polymers of silicic acid react very rapidly even at room temperatures, whereas reaction times of the order of an hour are required with the less reactive silica sources at temperatures in the neighborhood of 75° C.

The proper pH for formation of the soluble guanidine silicates of this invention is in excess of 10.5, and preferably in excess of 11. Guanidine hydroxide solutions which are sufficiently dilute to give pH values lower than this do not give satisfactory products. Below pH 11, rates of reaction are considerably slower than are desired, particularly when employing amorphous silica sols or powders as raw materials.

Solutions of guanidine hydroxide have only a limited stability. This stability is determined both by the temperature and by the concentration of guanidine hydroxide. If highly reactive solutions of silica are used such that temperatures of the reaction are low and reaction times are short, it is possible to use solutions of guanidine hydroxide containing up to 60% by weight. It is desirable to store very concentrated solutions of guanidine hydroxide at a temperature near 0° C. to minimize decomposition of guanidine. When less reactive sources of silica are used which require higher reaction temperatures, it is desirable to use less concentrated solutions of guanidine hydroxide as a reactant. Solutions containing about 30% by weight of guanidine hydroxide are relatively stable for periods of time of a few hours and those of 10% or less for 24 hours or more. Solutions of about 10 to 40% concentration are preferred, and these hydrolyze only to a negligible degree within the required reaction time of even the least reactive of the silica sources to be employed as raw materials.

Aqueous, amorphous guanidine silicate solutions used in the process of this invention contain from 10 to 30% $SiO_2$; about 20% $SiO_2$ is preferred. The guanidine to $SiO_2$ ratio ranges from 0.67/1 to 1.2/1; 0.75/1 to 1.1/1 is preferred.

To the above described aqueous solutions is added at room temperature from 1 to 10 volumes of ethanol or isopropanol. About 6 volumes of alcohol per volume of aqueous silicate solution is preferred because essentially 100% recovery of guanidine silicate is obtained with this ratio. Ethanol is preferred because of economic reasons. The alcohols cause amorphous guanidine silicate to precipitate from solution. The product is then easily filtered and air-dried by conventional means. If desired, the filtrate can be saved and the alcohol recovered by azeotropic distillation.

Other water-miscible solvents, such as dioxane, will precipitate the guanidine silicate. However, for reasons of economics, the use of the inexpensive lower alcohols is preferred.

The aqueous amorphous guandiine silicate solution may also contain soluble alkali metal silicates (Na, K, and Li) or colloidal, amorphous silica. These materials will also precipitate when the alcohol is added to produce a dry powder mixture of these materials with guanidine silicate. It has been observed that the presence of about 5% or less of colloidal silica helps to produce a uniform and non-sticky guanidine silicate product. Apparently, the colloidal silica acts as a nucleating agent. Thus, one preferred mode of operation includes the use of 5% colloidal silica for quality control.

Utility

The dry, amorphous guanidine silicate powders produced by the process of this invention can be used to reconstitute aqueous solutions of guanidine silicate, which exhibit properties as binders, adhesives and other uses described in U.S. patent application Ser. No. 715,556, filed Mar. 25, 1968. The dry powders themselves are particularly useful as a binder for MgO in high temperature ramming mixtures to repair eroded and torn areas in steel blast furnaces.

EXAMPLE 1

Eighteen thousand grams of water, 300 grams of anhydrous guanidine carbonate and 1260 grams of calcium hydroxide are mixed along with 1440 grams of a 120 m.$^2$/g. hydrated precipitated amorphous silica containing 93% $SiO_2$ and 7% water, are placed in a 15 gallon stainless steel tank equipped with a stirrer, and the mixture is heated to 43° C. in approximately 20 minutes, and held there for 30 minutes. The temperature is then taken to 80° in 15 minutes and held there for 30 minutes. The solution is then filtered, first through a coarse cloth filter and then through a paper filter.

This solution, after filtration to remove the precipitated calcium carbonate, has a percent solids by weight of 10 on drying at 100° C., a percent $SiO_2$ of 4.6, and molality of guanidine hydroxide of 1.01. The guanidine to silica mole ratio at this point is 1.317.

Three thousand milliliters of this solution is placed in a vacuum flask and heated to 62° C. and excess water distilled off. The distillation is continued with periodic replacement by more of the solution prepared as described above, until 9 liters of the original solution have been reduced in volume to approximately 3 liters. The solution is cooled and filtered, and analyzed. Analysis shows 33% solids on drying in an oven at 100° C., 12% $SiO_2$, and a guanidine hydroxide molality as determined by titration with HCl to a pH of 7 of 1.927. The guanidine to silica mole ratio is therefore 0.963. The decrease in the guanidine to silica ratio is the result of decomposition of guanidine into ammonia which is lost during the heating and distillation necessary to concentrate the product.

Seven thousand eight hundred milliliters of ethyl alcohol and 66 grams of a deionized solution of "Ludox" AS colloidal amorphous silica sol having an average particle size of 20 millimicrons, are placed in a 12-liter bucket with a high speed air stirrer. One thousand three hundred and twenty-eight grams of the guanidine silicate solution prepared as described above are delivered from a 500 ml. burette over a period of approximately 10 minutes. The resulting, easily filtered precipitate is stirred for 5 minutes and then allowed to settle. It is filtered and washed with 600 ml. of ethanol. It is dried in a vacuum oven overnight at 25° C. with a slight purge of nitrogen. Analysis shows the dry, free-flowing white powder to consist of 30.96% guanidine, 36% $SiO_2$, and 33% water. The mole ratio of guanidine to silica in this product is 0.86, which is only slightly lower than the mole ratio in the original starting solution, of 0.96. This product can be stored indefinitely in a closed bottle, in a normal laboratory atmosphere, with no tendency to become hydroscopic. The dry guanidine silicate redissolves substantially instantaneously in water with only a slight turbidity resulting from the 5% of colloidal silica nucleating agent employed during the preparation.

EXAMPLE 2

Seven thousand eight hundred milliliters of anhydrous isopropyl alcohol and 66 grams of deionized "Ludox" AS are placed in a 12-liter bucket equipped with a high speed stirrer, and 1328 grams of the concentrated guanidine silicate solution of Example 1 are delivered into the isopropyl alcohol solution in a manner substantially identical with that of Exampe 1.

Again, a fine, easily filtered precipitate is obtained, which is washed with 600 ml. of isopropanol and dried in vacuum overnight at 25° C., with a slight nitrogen purge. The chemical analysis of this product is substantially identical with that obtained using ethanol as a precipitating solvent, and the storage characteristics and water solubility are also indistinguishable from the product obtained with ethanol.

What is claimed is:

1. A process for preparing dry non-crystalline guanidine silicate compositions comprising contacting an aqueous solution of soluble amorphous guanidine silicate having a guanidine to $SiO_2$ mole ratio of from 0.67:1 to 1.2:1 with one to ten volumes of ethanol or isopropanol per volume of said aqueous solution which contains from 10% to 30% $SiO_2$ by weight and recovering the resulting precipitated amorphous guanidine silicate and drying.

2. A process as in claim 1 which comprises the addition of ethanol to the aqueous amorphous guanidine silicite solution.

3. A process as in claim 1 where said aqueous amorphous guanidine silicate solution contains about 20% by weight $SiO_2$.

4. A process as in claim 1 wherein said ratio of guanidine to $SiO_2$ is 0.75:1 to 1.1:1.

5. A process as in claim 1 where the volume of ethanol or isopropanol to silicate solution is about 6:1.

6. A process as in claim 1 where up to 5% by weight of a colloidal silica nucleating agent is added to said aqueous amorphous guanidine silicate solution with the ethanol or iropropanol.

References Cited

UNITED STATES PATENTS

| | | | |
|---|---|---|---|
| 2,689,245 | 9/1954 | Merrill | 260—448.2X |
| 3,239,521 | 3/1966 | Weldes | 260—448.2X |
| 3,239,549 | 3/1966 | Weldes | 260—448.2X |
| 3,248,329 | 4/1966 | Pines et al. | 260—448.2X |
| 3,326,910 | 6/1967 | Weldes | 260—448.2X |
| 3,338,901 | 8/1967 | Weldes | 260—448.2X |
| 3,383,386 | 5/1968 | Weldes | 260—448.2X |

JAMES E. POER, Primary Examiner

W. F. W. BELLAMY, Assistant Examiner

U.S. Cl. X.R.

260—448.2E, 448.8R